United States Patent
Shimomura

(10) Patent No.: US 11,264,230 B2
(45) Date of Patent: Mar. 1, 2022

(54) QUADRUPOLE MASS SPECTROMETER

(71) Applicant: SHIMADZU CORPORATION, Kyoto (JP)

(72) Inventor: Manabu Shimomura, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 0 days.

(21) Appl. No.: 16/605,680

(22) PCT Filed: Jun. 29, 2017

(86) PCT No.: PCT/JP2017/023841
§ 371 (c)(1),
(2) Date: Oct. 16, 2019

(87) PCT Pub. No.: WO2019/003365
PCT Pub. Date: Jan. 3, 2019

(65) Prior Publication Data
US 2020/0126780 A1    Apr. 23, 2020

(51) Int. Cl.
*H01J 49/42* (2006.01)
*H01J 49/06* (2006.01)

(52) U.S. Cl.
CPC ........ *H01J 49/4215* (2013.01); *H01J 49/062* (2013.01)

(58) Field of Classification Search
CPC .. H01J 49/0009; H01J 49/0027; H01J 49/062; H01J 49/4215
See application file for complete search history.

(56) References Cited

U.S. PATENT DOCUMENTS 8,704,162 B1 * 4/2014 Shiohama ........... H01J 49/0009
250/281
2002/0162959 A1 * 11/2002 Itoi ....................... H01J 49/067
250/292

(Continued)

FOREIGN PATENT DOCUMENTS

GB    2525465 B  * 7/2018  .......... H01J 49/0009
JP    2002-329474 A    11/2002

(Continued)

OTHER PUBLICATIONS

International Search Report for PCT/JP2017/023841 dated, Sep. 19, 2017 (PCT/ISA/210).

(Continued)

*Primary Examiner* — David E Smith
(74) *Attorney, Agent, or Firm* — Sughrue Mion, PLLC

(57) ABSTRACT

Measurement of a standard sample is repeated under control of an analysis control unit (94) while a CD voltage applied to a conversion dynode (61) of a detection unit (6) is gradually changed by a CD voltage adjustment unit (96). Then, every time a measured mass spectrum is obtained, a spectrum pattern determination unit (93) determines whether a pattern of the measured mass spectrum matches a pattern of a standard mass spectrum of a standard sample in a compound database (92), and determines the CD voltage at the time of being regarded as matching to be the set value. When the pattern of the mass spectrum is adjusted by changing the voltage applied to the ion lens (3), performance such as sensitivity is likely to be unstable due to stain on the lens electrode or the like, but since the detection unit (6) is unlikely to be affected by such a stain, unstable performance can be avoided.

9 Claims, 3 Drawing Sheets

(56) References Cited

U.S. PATENT DOCUMENTS

| | | | |
|---|---|---|---|
| 2005/0211892 A1* | 9/2005 | Shimomura | H01J 49/10 250/282 |
| 2009/0090862 A1 | 4/2009 | Kawana et al. | |
| 2015/0219607 A1* | 8/2015 | Fujita | H01J 49/0431 250/288 |
| 2016/0247669 A1 | 8/2016 | Tateishi et al. | |

FOREIGN PATENT DOCUMENTS

| | | |
|---|---|---|
| JP | 2005-83952 A | 3/2005 |
| JP | 4793440 A | 10/2011 |
| JP | 2013-254668 A | 12/2013 |
| JP | 2016-157523 A | 9/2016 |

OTHER PUBLICATIONS

Written Opinion of the International Searching Authority for PCT/JP2017/023841 dated, Sep. 19, 2017 (PCT/ISA/237).

\* cited by examiner

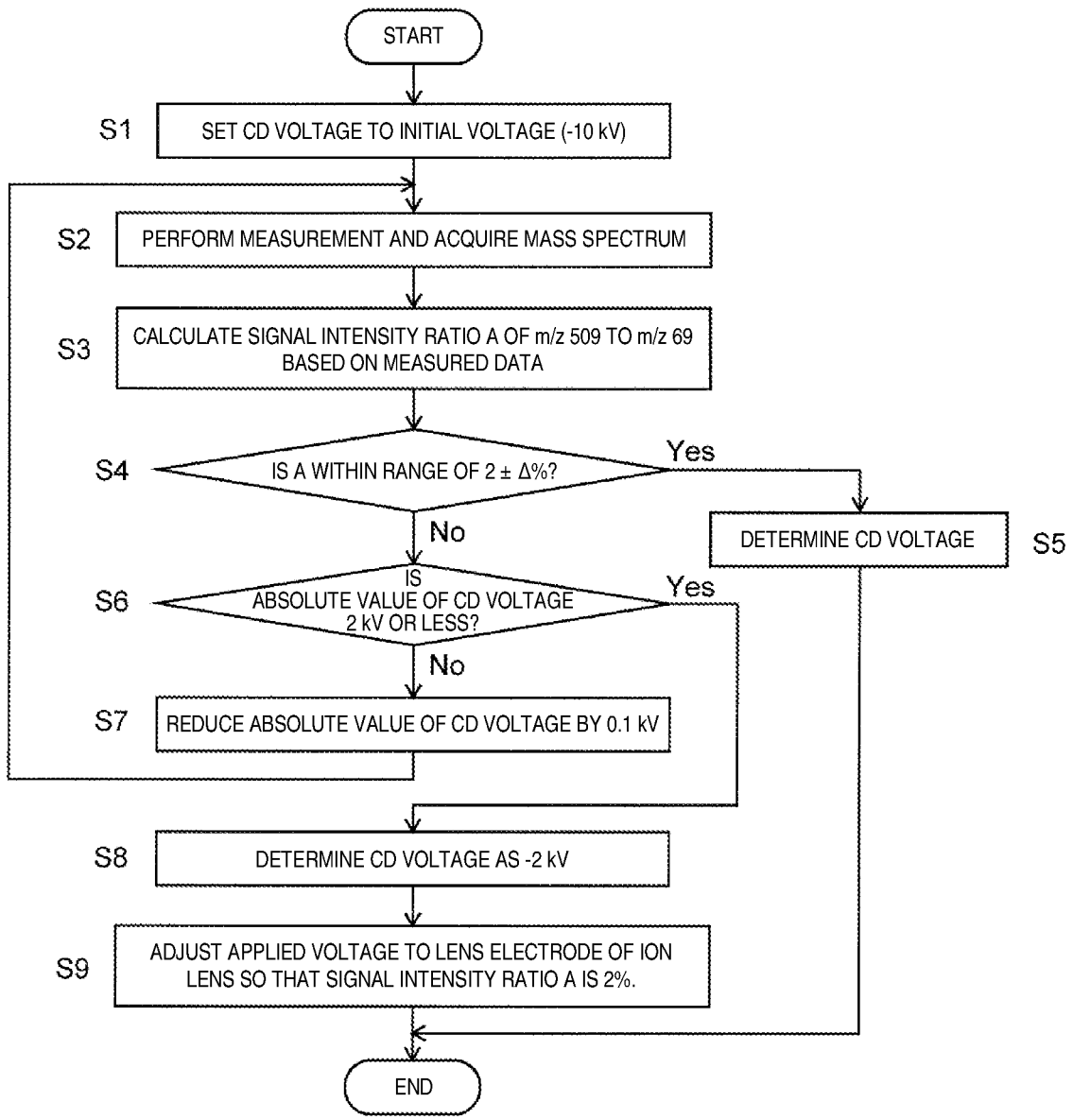

STANDARD MASS SPECTRUM (TARGET)

MASS SPECTRUM AT CD VOLTAGE: -10 kV

QUADRUPOLE MASS SPECTROMETER

CROSS REFERENCE TO RELATED APPLICATIONS

This application is a National Stage of International Application No. PCT/JP2017/023841 filed Jun. 29, 2017.

TECHNICAL FIELD

The present invention relates to a quadrupole mass spectrometer using a quadrupole mass filter as a mass separator. Herein, the term "quadrupole mass spectrometer" refers to a mass spectrometer in which the mass separator disposed immediately in front of an ion detector is a quadrupole mass filter, and includes not only a single-type quadrupole mass spectrometer, but also a triple quadrupole mass spectrometer in which quadrupole mass filters are disposed in front and behind across a collision cell.

BACKGROUND ART

In a common quadrupole mass spectrometer used for a gas chromatograph mass spectrometer (GC-MS) or the like, an ion source generates ions from compounds contained in a sample gas, the generated various ions are separated by a quadrupole mass filter according to the mass-to-charge ratio m/z, and the separated ions are detected by an ion detector. Repeating a mass scan over a predetermined mass-to-charge ratio range in the quadrupole mass filter allows a mass spectrum showing the relationship between the mass-to-charge ratio and the signal intensity to be repeatedly acquired. When compound identification is performed in such a mass spectrometer, the spectrum pattern of the obtained mass spectrum is compared with the spectrum patterns of the mass spectrum stored in the known compound database, and a database search (library search) of searching for a compound whose pattern is similar to the spectrum pattern is often performed (see Patent Literature 1 and the like).

There are various compound databases used for this purpose, but the recorded mass spectrums are often those measured by conventional type mass spectrometers. In such a case, the patterns may be somewhat different between a mass spectrum obtained by measuring a certain compound by using a relatively new type of mass spectrometer with high-precision and high-sensitivity and a mass spectrum of the compound stored in the compound database. Therefore, when compound identification is performed by using a compound database storing mass spectrums measured by such conventional type mass spectrometers, the mass spectrometer itself for performing the measurement is adjusted so that, regarding the same compound, the spectrum pattern of the measured mass spectrum and the spectrum pattern of the mass spectrum in the compound database match as much as possible.

The above adjustment can be said to be an adjustment that intentionally degrades the performance of the mass spectrometer, and normally, in order to efficiently introduce the ions generated by the ion source into the quadrupole mass filter, the voltage applied to the lens electrode constituting the ion lens disposed between the ion source and the quadrupole mass filter is often adjusted. Changing this voltage changes the convergence of the ion lens, but the degree of the change in the convergence differs depending on the mass-to-charge ratio. Therefore, changing the applied voltage to the lens electrode changes the introduction efficiency of ions to the quadrupole mass filter depending on the mass-to-charge ratio, and as a result, the spectrum pattern of the obtained mass spectrum changes. In addition, appropriately changing the voltage applied to the lens electrode in synchronization with the mass scan can also change the spectrum pattern of the mass spectrum.

CITATION LIST

Patent Literature

Patent Literature 1: JP 2005-83952 A ([0002] to [0003])
Patent Literature 2: JP 2002-329474 A

SUMMARY OF INVENTION

Technical Problem

As described above, adjusting the applied voltage to the lens electrode allows the spectrum pattern of the mass spectrum to be adjusted. In such adjustment, since the voltage applied to the lens electrode is set to a non-optimum state in the ion passage efficiency, the performance tends to be unstable, and for example, if the lens electrode is stained, the detection sensitivity is lowered as a whole and some compounds cannot be detected or the spectrum pattern of mass spectrum changes. On the other hand, besides the lens electrode for converging the ions emitted from the ion source being exposed to many ions, non-ionized sample component molecules and carrier gas used in gas chromatograph also collide against the lens electrode, so that contamination of the lens electrode is likely to proceed. Therefore, for example, to stably obtain the measured mass spectrum of a spectrum pattern same as that of a mass spectrum in a database for a certain compound, there has been a problem that the mass spectrometer has to be frequently re-adjusted.

The present invention has been made to solve these problems, and the object of the present invention is to provide a quadrupole mass spectrometer capable of stably adjusting the spectrum pattern of a mass spectrum for compound identification and for other purposes.

Solution to Problem

The present invention made to solve the above problems is a quadrupole mass spectrometer using a quadrupole mass filter as a mass separation unit configured to separate ions to be measured according to a mass-to-charge ratio, the quadrupole mass spectrometer including:

a) a detection unit configured to detect ions having passed through the quadrupole mass filter;

b) a voltage adjustment unit configured to adjust any one of a voltage that determines a gain in the detection unit, and a voltage to be applied to an electrode configured to form an electric field in a path of ions having passed through the quadrupole mass filter to the detection unit; and c) a control unit configured to adjust a voltage with the voltage adjustment unit so that at least a part of a spectrum pattern in a measured mass spectrum obtained by measurement in the quadrupole mass spectrometer of a predetermined sample matches or approaches a corresponding spectrum pattern in a target mass spectrum.

In the quadrupole mass spectrometer according to the present invention, the target mass spectrum is typically a standard mass spectrum recorded in the compound database as described above. Here, the mass spectrum includes an MS² spectrum obtained by a triple quadrupole mass spectrometer.

In the quadrupole mass spectrometer according to the present invention, for example, the control unit compares a spectrum pattern of a measured mass spectrum obtained by performing measurement with the quadrupole mass spectrometer on a predetermined standard sample with a spectrum pattern of a standard mass spectrum recorded in a compound database on the same standard sample, and adjusts the voltage with the voltage adjustment unit so that the patterns approach each other. The voltage adjustment unit adjusts the gain of the detection unit or the state of the electric field (potential gradient or intensity of electric field) in the ion passage at the stage of detecting ions at the detection unit or at the stage of guiding ions to the detection unit, that is the ions after passing through the quadrupole mass filter rather than before passing through the quadrupole mass filter, in other words, the ions having a specific mass-to-charge ratio being focused on or the ions included in a specific mass-to-charge ratio range. The spectrum pattern mentioned here may be a ratio of signal intensities of two or more peaks appearing in a mass spectrum.

One aspect of the quadrupole mass spectrometer according to the present invention may have a configuration in which the detection unit includes a conversion dynode and a secondary electron multiplier, and the voltage adjustment unit is also configured to adjust a voltage to be applied to the conversion dynode.

In this configuration, changing the voltage applied to the conversion dynode changes the state of the electric field that draws (attracts) ions having passed through the quadrupole mass filter into the conversion dynode. When the state of the attracting electric field changes, the influence of the change depends on the mass-to-charge ratio of the ions. As a result, the amount of ions reaching the conversion dynode, that is, the arrival efficiency of the ions to the detection unit differs depending on the mass-to-charge ratio, resulting in a change in the spectrum pattern.

Another aspect of the quadrupole mass spectrometer according to the present invention may have a configuration which further includes an electrode configured to form an electric field for converging ions emitted from an outlet of the quadrupole mass filter between an outlet of the quadrupole mass filter and the detection unit, in which the voltage adjustment unit is also configured to adjust a voltage applied to the electrode.

An example of the electrode in this configuration can be a lens electrode of a bipolar type for converging ions, disposed immediately after the outlet of the quadrupole mass filter, as disclosed in Patent Literature 2. In this configuration, changing the voltage applied to the electrode changes the convergence of ions coming out of the quadrupole mass filter and changes the amount of ions that can reach the conversion dynode or the like. Since the convergence of the ions differs depending on the mass-to-charge ratio, the efficiency in which ions having different mass-to-charge ratios reach the detection unit are different, resulting in a change in a spectrum pattern.

Still another aspect of the quadrupole mass spectrometer according to the present invention may have a configuration which further includes an electrode configured to change a state of an electric field for attracting ions to the detection unit between an outlet of the quadrupole mass filter and the detection unit, in which the voltage adjustment unit is also configured to adjust a voltage applied to the electrode.

An example of the electrode in this configuration can be a shield electrode disposed between the aperture electrode immediately after the outlet of the quadrupole mass filter and the conversion dynode, as disclosed in PCT/JP2017/018454 filed by the present applicant. In this configuration, changing the voltage applied to the shield electrode changes the state of the attracting electric field for the ions having passed through the aperture electrode. Since changes in the behavior of ions with respect to changes in the state of the attracting electric field depend on the mass-to-charge ratio, the efficiency in which ions having different mass-to-charge ratios reach the conversion dynode differs, resulting in a change in a spectrum pattern.

Regardless of which configuration is adopted as the voltage adjustment unit, the control unit is configured only to adjust the voltage with the voltage adjustment unit so that the spectrum patterns of the measured mass spectrum and the standard mass spectrum match or approach each other.

The components of the detection unit, such as the conversion dynode and the secondary electron multiplier described above, are hardly affected or less likely to be affected by stain or the like due to attachment of ions, neutral particles, and the like, and there is substantially no instability in measurement performance depending on the set voltage. In addition, since ions are selected by the quadrupole mass filter, the amount of ions passing in the back stage of the quadrupole mass filter is remarkably less than that in the front stage, and some neutral particles such as sample component molecules may pass through the quadrupole mass filter, but the amount of the neutral particles is remarkably less than that in the front stage of the quadrupole mass filter. Therefore, the electrode disposed between the outlet of the quadrupole mass filter and the detection unit is also much less likely to be stained as compared with the lens electrode in the front stage of the quadrupole mass filter. Thus, even when the ion convergence efficiency and the ion collection efficiency are not optimum, the instability of the measurement performance depending on the set voltage is small.

In addition, the quadrupole mass spectrometer according to the present invention may have a configuration which further includes an ion transport optical system between an ion source configured to generate ions derived from a sample component and the quadrupole mass filter, in which when the control unit adjusts a voltage with the voltage adjustment unit, if a difference between at least a part of a pattern in a measured mass spectrum and a corresponding pattern in a target mass spectrum does not fall within an allowable range, the control unit adjusts a voltage to be applied to the ion transport optical system so that the difference falls within the allowable range.

According to this configuration, even when the spectrum patterns of the mass spectrums cannot be sufficiently matched only by adjusting the voltages applied to the detection unit or the electrode positioned in the back stage of the quadrupole mass filter, the voltages applied to the ion transport optical system (such as the ion lens described above) in the front stage of the quadrupole mass filter is adjusted to allow the spectrum patterns of the mass spectrums to be matched sufficiently.

Advantageous Effects of Invention

According to the quadrupole mass spectrometer according to the present invention, even when the performance of the quadrupole mass spectrometer is intentionally degraded and the spectrum pattern of the mass spectrum is adjusted, the stability of the performance can be ensured. As a result, for example, there is no need to frequently re-adjust the spectrum pattern of the mass spectrum, and the efficiency of the measurement is improved. In addition, since the matching performance of the spectrum patterns between the measured mass spectrum of a certain compound and the mass spectrum of the same compound in the compound database is maintained, the accuracy of compound identification by database search can be improved.

BRIEF DESCRIPTION OF DRAWINGS

FIG. 2 is a flow chart showing a procedure of adjustment processing of a mass spectrum pattern in the quadrupole mass spectrometer of the present embodiment.

DESCRIPTION OF EMBODIMENTS

Hereinafter, a quadrupole mass spectrometer being an embodiment of the present invention will be described with reference to the attached drawings.

Figure 1:
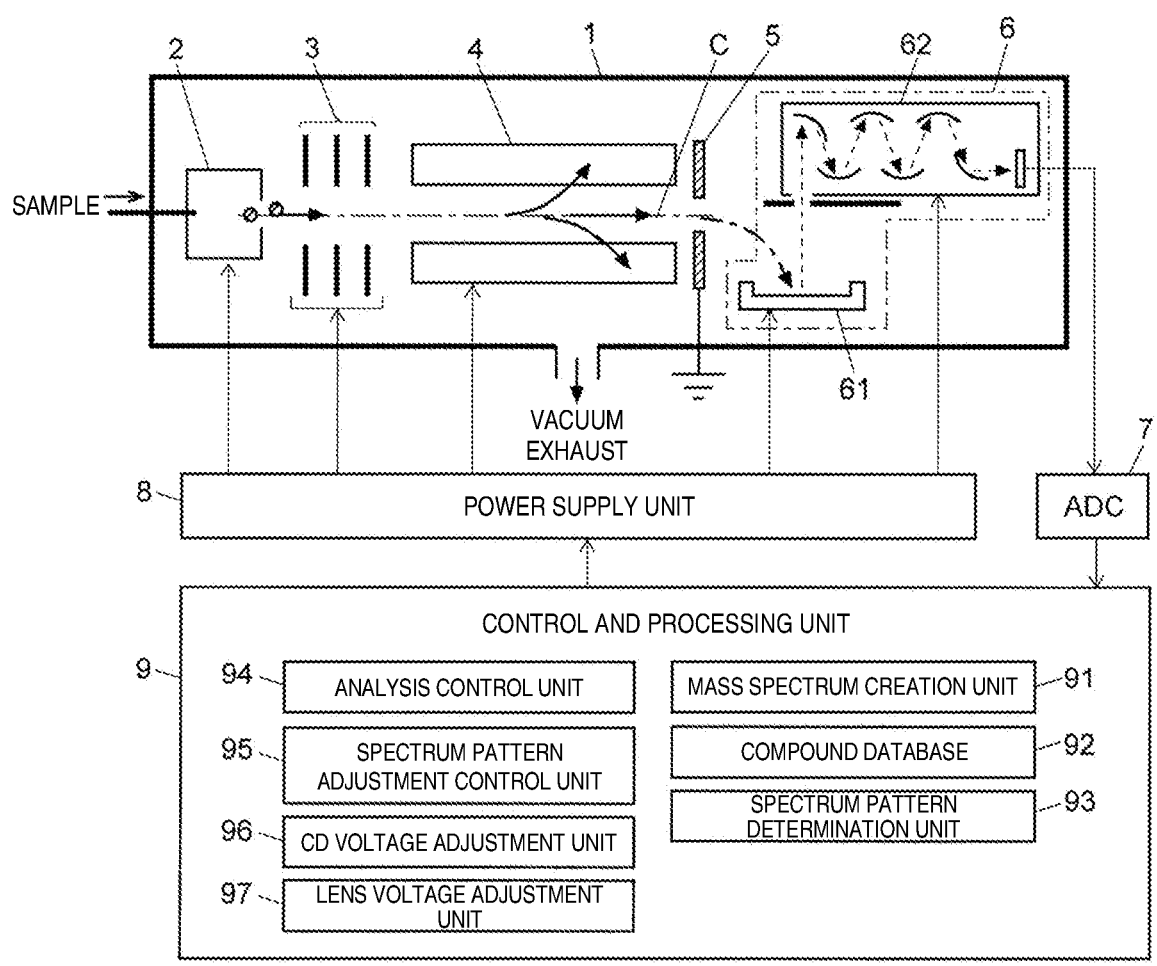
FIG. 1 is a schematic block diagram of a quadrupole mass spectrometer according to an embodiment of the present invention.

FIG. 1 is a schematic block diagram of the quadrupole mass spectrometer of the present embodiment.

Inside the vacuum chamber 1 evacuated by a vacuum pump (not shown), an ion source 2 for performing ionization by electron ionization (EI) method, chemical ionization (CI) method, or the like, an ion lens 3 for transporting ions while converging ions, a quadrupole mass filter 4 including four rod electrodes arranged around the ion optical axis C, an aperture electrode 5 being disk-shaped and in which a circular ion passage opening is formed, and a detection unit 6 including a conversion dynode 61 and a secondary electron multiplier 62 are disposed. A detected signal by the detection unit 6 is converted into digital data by an analog-to-digital converter (ADC) 7 to be input into the control and processing unit 9. The power supply unit 8 applies a predetermined voltage to each unit, and the control and processing unit 9 receives the above data to perform predetermined data processing and control the operation of the power supply unit 8 and the like.

The control and processing unit 9 includes, as functional blocks, a mass spectrum creation unit 91, a compound database 92, a spectrum pattern determination unit 93, an analysis control unit 94, a spectrum pattern adjustment control unit 95, a conversion dynode (CD) voltage adjustment unit 96, a lens voltage adjustment unit 97, and the like. The compound database 92 stores information such as compound names, molecular weights, chemical formulas (structural formulas), and standard mass spectrums for various compounds. The compound database 92 may be generally provided or may be provided to the user by the device maker. It should be noted that the substance of the control and processing unit 9 is a personal computer, and the function of each block described above can be achieved by causing a dedicated software installed in the computer to operate on the computer.

Figure 3A:
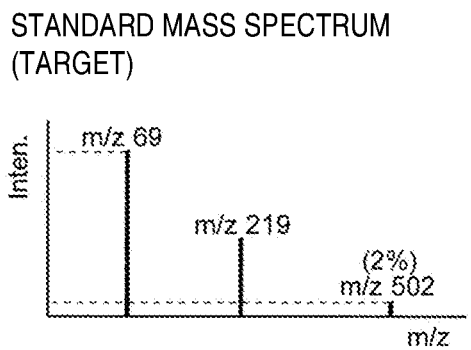
FIGS. 3A and 3B are diagrams for illustrating a method of adjusting a mass spectrum pattern in the quadrupole mass spectrometer of the present embodiment.
Figure 3B:
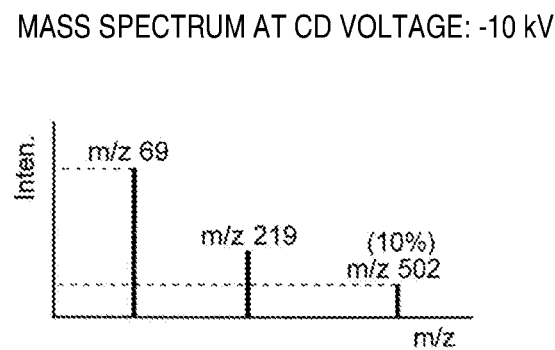

Next, characteristic mass spectrum pattern adjustment processing in the quadrupole mass spectrometer of the present embodiment will be described with reference to FIGS. 2 to 3B. FIG. 2 is a flowchart showing the procedure of mass spectrum pattern adjustment processing, and FIGS. 3A and 3B are diagrams for illustrating mass spectrum pattern adjustment. With the standard mass spectrum of a certain compound as a reference, this mass spectrum pattern adjustment processing is processing of adjusting the parameters of the device so as to cause the spectrum pattern of the mass spectrum obtained when the sample containing this compound is measured by the quadrupole mass spectrometer to match the spectrum pattern of the above standard mass spectrum.

When the processing is started, first, the CD voltage adjustment unit 96 controls the power supply unit 8 so that the power supply unit 8 applies a predetermined initial voltage to the conversion dynode 61. Here, the initial voltage is −10 kV, and a high voltage of −10 kV is applied to the conversion dynode 61 (step S1). It should be noted that, needless to say, the polarity of the CD voltage is negative because the ion to be measured is a positive ion, and when the ion to be measured is a negative ion, the polarity of the CD voltage is positive.

The analysis control unit 94 controls the power supply unit 8 so that the scan measurement of the predetermined sample is performed in that state. Thus, a detected signal over a predetermined mass-to-charge ratio range of the sample is output from the detection unit 6, and the mass spectrum creation unit 91 creates a mass spectrum based on the digitized data of the detected signal (step S2). The standard sample has only to be used for a sample to be measured, and in this case, perfluorotributylamine (PFTBA) is used as an example.

The spectrum pattern determination unit 93 obtains the signal intensity value S1 of the peak of m/z 69 and the signal intensity value S2 of the peak of m/z 502 in the measured mass spectrum obtained in step S2, and calculates the signal intensity ratio A ((S2/S1)×100) (step S3). In this case, the signal intensity ratio is a spectrum pattern. Now, it is assumed that the measured mass spectrum is in a situation as shown in FIG. 3B, and the signal intensity ratio A is 10%. The spectrum pattern determination unit 93 also reads the standard mass spectrum of PFTBA stored in the compound database 92, and calculates the signal intensity ratio of the same two mass-to-charge ratio peaks as described above. This signal intensity ratio is the target value. Now, it is assumed that the standard mass spectrum is in a situation as shown in FIG. 3A, and the signal intensity ratio A is 2%.

Then, the spectrum pattern determination unit 93 determines whether the measured signal intensity ratio A calculated in step S3 is within the range of 2±Δ% being the target value (step S4). Here, ±Δ is an allowable range and may be determined as appropriate. If it is determined as Yes in step S4, the spectrum pattern of the measured mass spectrum can be regarded as substantially matching the spectrum pattern of the standard mass spectrum, so that the spectrum pattern adjustment control unit 95 determines the CD voltage at that time as the set value of the CD voltage (step S5).

On the other hand, if it is determined as No in step S4, the spectrum pattern adjustment control unit 95 determines whether the absolute value of the CD voltage at that time is not more than 2 kV (step S6). Reducing the absolute value of the CD voltage to not more than 2 kV may prevent the electron emission operation of the conversion dynode 61 from being properly performed, it is not desirable to reduce the absolute value of the CD voltage to not more than 2 kV.

Thus, if it is determined as Yes in step S6, the spectrum pattern adjustment control unit 95 determines the set value of the CD voltage as −2 kV (step S8), and the process proceeds to step S9. On the other hand, if it is determined as No in step S6, there is still room for reducing the CD voltage. Thus, the CD voltage adjustment unit 96 reduces the absolute value of the CD voltage by 0.1 kV (step S7), and the process returns to step S2.

Therefore, when the process returns from step S7 to step S2 and performs the processing of steps S2 to S4, the same processing as that one time before is performed in a state where the absolute value of the CD voltage is lower by 0.1 kV than that in the processing of steps S2 to S4 one time before.

The trajectories of the ions having passed through the quadrupole mass filter 4 and the grounded aperture electrode 5 along the ion optical axis C are gradually bent and the ions are attracted to the conversion dynode 61 by the action of the attracting electric field formed in the space between the aperture electrode 5 and the conversion dynode 61 caused by the potential difference between the aperture electrode 5 and the conversion dynode 61. Lowering the absolute value of the CD voltage weakens the attracting electric field, and it becomes difficult for ions having passed through the quadrupole mass filter 4 to reach the conversion dynode 61. The larger mass-to-charge ratio the ions have, the larger the influence of weakening of the attracting electric field is, so that lowering the absolute value of the CD voltage makes the decrease in signal intensity of the relatively high mass-to-charge ratio peak large, as compared with that of the relatively low mass-to-charge ratio peak. Therefore, generally, the signal intensity ratio A decreases as the absolute value of the CD voltage decreases.

That is, as described above, as the absolute value of the CD voltage is lowered from the state where the signal intensity ratio A is 10% with respect to the initial voltage of the CD voltage, the signal intensity ratio A gradually approaches the target value of 2%. Then, if it is determined as Yes in step S4 in the process of repeating the processing of steps S2 to S7 multiple times, the process proceeds from step S4 to step S5 at that time, and the set value of the CD voltage is determined.

On the other hand, if it is determined as Yes in step S6 before it is determined as Yes in step S4 during the process of repeating the processing of steps S2 to S7, it is impossible to cause the signal intensity ratio A to match the target value only by adjusting the CD voltage. Thus, as described above, after the CD voltage is set to −2 kV in step S8, the process proceeds to step S9, and thereafter the lens voltage applied to the ion lens 3 is adjusted to put the signal intensity ratio A into a range of 2±Δ%. That is, the lens voltage adjustment unit 97 controls the power supply unit 8 so that the power supply unit 8 changes the lens voltage at a predetermined step width, and executes the same processing as that of the steps S2 to S4 and S7 each time the lens voltage changes. Then, at the point of time the signal intensity ratio A falls within the range of 2±Δ%, the set value of the lens voltage has only to be determined.

Naturally, if the lens voltage is not to be changed, the processing of step S9 can be omitted.

Figure 4:
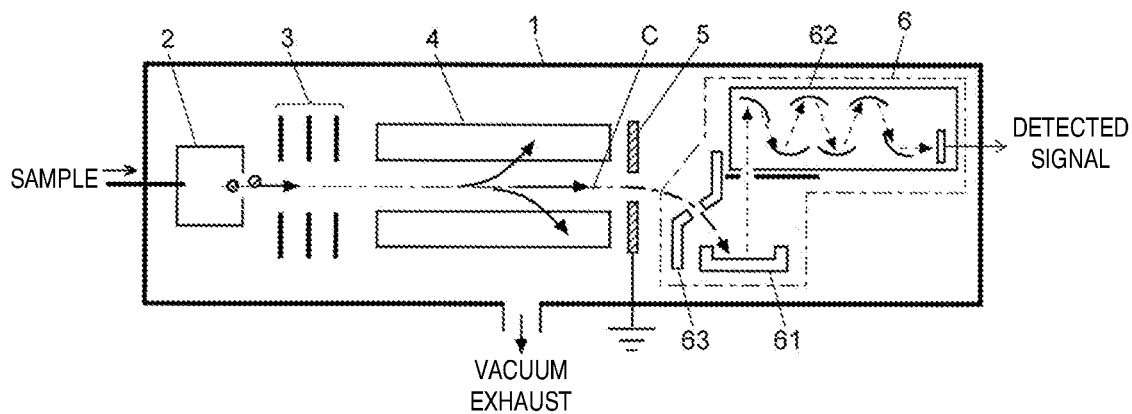
FIG. 4 is a schematic block diagram of a quadrupole mass spectrometer according to another embodiment of the present invention.
Figure 5:
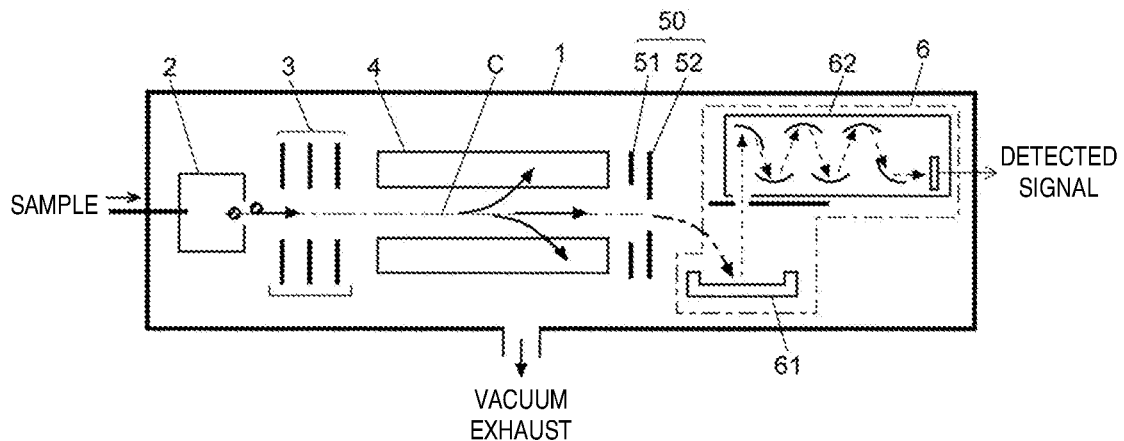
FIG. 5 is a schematic block diagram of a quadrupole mass spectrometer according to still another embodiment of the present invention.

In the above embodiment, changing the voltage applied to the conversion dynode 61 changes the spectrum pattern of the measured mass spectrum, but the voltage applied to another component may be changed. FIGS. 4 and 5 are schematic block diagrams of a quadrupole mass spectrometer according to such modifications. In these figures, the same components as those of the quadrupole mass spectrometer of the above embodiment are denoted by the same reference numerals.

In the quadrupole mass spectrometer shown in FIG. 4, the detection unit 6 includes a shield electrode 63 disposed between the aperture electrode 5 and the conversion dynode 61. This shield electrode 63 is disclosed in, for example, PCT/JP2017/018454, and includes a blocking wall positioned on an extension line of the ion optical axis C, and an ion attraction electric field adjustment wall formed continuously with the blocking wall and inclined at a predetermined angle with respect to the extension line, and an ion passage opening is formed in the ion attraction electric field adjustment wall. A predetermined voltage between the applied voltage to the conversion dynode 61 and the potential of the aperture electrode 5 (here, 0 V) is applied to the shield electrode 63 from the power supply unit.

The blocking wall of the shield electrode 63 blocks the passage of various neutral particles and the like having passed through the quadrupole mass filter 4. On the other hand, since the ion attraction electric field adjustment wall becomes the voltage applied to the shield electrode 63, the potential gradient in the electric field between the shield electrode 63 and the aperture electrode 5 changes depending on the applied voltage. Therefore, even if the applied voltage to the conversion dynode 61 is constant, changing the voltage applied to the shield electrode 63 changes the state of the attracting electric field of ions, and changes the amount of ions reaching the conversion dynode 61. Thus, the same effect as in the case of changing the applied voltage to the conversion dynode 61 can be obtained, and thus, the spectrum pattern of the mass spectrum can be adjusted as in the above embodiment.

In the quadrupole mass spectrometer shown in FIG. 5, an ion converging lens 50 including two lens electrodes 51 and 52 is disposed between the outlet of the quadrupole mass filter 4 and the detection unit 6. The ion converging lens 50 is disclosed, for example, in Patent Literature 2, and different predetermined voltages are applied to the respective two lens electrodes 51 and 52. Changing the voltages applied to the two lens electrodes 51 and 52 changes the convergence of the ions passing through the ion converging lens 50, and changes the potential difference between the lens electrode 52 and the conversion dynode 61 to also change the state of the electric field between the lens electrode 52 and the conversion dynode 61. That is, since the convergence of ions and the state of the attracting electric field of ions change together, the amount of ions reaching the conversion dynode 61 changes. Thus, the same effect as in the case of changing the applied voltage to the conversion dynode 61 can be obtained, and thus, the spectrum pattern of the mass spectrum can be adjusted as in the above embodiment.

In addition, in the quadrupole mass spectrometer shown in FIG. 1, changing the voltage applied to the secondary electron multiplier 62 (normally, a high voltage applied to the first stage dynode) changes the electron multiplication factor, so that changing this voltage may adjust the spectrum pattern of the mass spectrum.

In addition, since any one the above embodiments is an example of the present invention, even if appropriate modifications, additions, and amendments are made within the scope of the present invention, it is obvious that those are included in the claims of the present application.

REFERENCE SIGNS LIST

1 . . . Vacuum Chamber
2 . . . Ion Source

3 ... Ion Lens
4 ... Quadrupole Mass Filter
5 ... Aperture Electrode
50 ... Ion Converging Lens
51, 52 ... Lens Electrode
6 ... Detection Unit
61 ... Conversion Dynode
62 ... Secondary Electron Multiplier
63 ... Shield Electrode
7 ... Analog-To-Digital Converter
8 ... Power Supply Unit
9 ... Control and Processing Unit
91 ... Mass Spectrum Creation Unit
92 ... Compound Database
93 ... Spectrum Pattern Determination Unit
94 ... Analysis Control Unit
95 ... Spectrum Pattern Adjustment Control Unit
96 ... CD Voltage Adjustment Unit
97 ... Lens Voltage Adjustment Unit
C ... Ion Optical Axis

The invention claimed is:

1. A quadrupole mass spectrometer using a quadrupole mass filter as a mass separation unit configured to separate ions to be measured according to a mass-to-charge ratio, the quadrupole mass spectrometer comprising:
   a) a detection unit configured to detect ions having passed through the quadrupole mass filter;
   b) a voltage adjustment unit configured to adjust any one of
   a voltage that determines a gain in the detection unit, and
   a voltage to be applied to an electrode configured to form an electric field in a path of ions having passed through the quadrupole mass filter to the detection unit; and
   c) a control unit configured to adjust a voltage with the voltage adjustment unit so that a spectrum pattern in a measured mass spectrum obtained by measurement in the quadrupole mass spectrometer of a predetermined sample matches or approaches a corresponding spectrum pattern in a target mass spectrum, which is a standard mass spectrum of the predetermined sample recorded in a compound database.

2. The quadrupole mass spectrometer according to claim 1, wherein
   the detection unit includes a conversion dynode and a secondary electron multiplier, and
   the voltage adjustment unit is also configured to adjust a voltage to be applied to the conversion dynode.

3. The quadrupole mass spectrometer according to claim 1, further comprising an electrode configured to form an electric field for converging ions emitted from an outlet of the quadrupole mass filter between an outlet of the quadrupole mass filter and the detection unit,
   wherein the voltage adjustment unit is also configured to adjust a voltage applied to the electrode.

4. The quadrupole mass spectrometer according to claim 1, further comprising an electrode configured to change a state of an electric field for attracting ions to the detection unit between an outlet of the quadrupole mass filter and the detection unit,
   wherein the voltage adjustment unit is also configured to adjust a voltage applied to the electrode.

5. The quadrupole mass spectrometer according to claim 1, further comprising an ion transport optical system between an ion source configured to generate ions derived from a sample component and the quadrupole mass filter,
   wherein the control unit, in adjusting a voltage with the voltage adjustment unit, if a difference between at least a part of a pattern in a measured mass spectrum and a corresponding pattern in a target mass spectrum does not fall within an allowable range, is configured to adjust a voltage to be applied to the ion transport optical system so that the difference falls within the allowable range.

6. The quadrupole mass spectrometer according to claim 2, further comprising an ion transport optical system between an ion source configured to generate ions derived from a sample component and the quadrupole mass filter,
   wherein the control unit, in adjusting a voltage with the voltage adjustment unit, if a difference between at least a part of a pattern in a measured mass spectrum and a corresponding pattern in a target mass spectrum does not fall within an allowable range, is configured to adjust a voltage to be applied to the ion transport optical system so that the difference falls within the allowable range.

7. The quadrupole mass spectrometer according to claim 3, further comprising an ion transport optical system between an ion source configured to generate ions derived from a sample component and the quadrupole mass filter,
   wherein the control unit, in adjusting a voltage with the voltage adjustment unit, if a difference between at least a part of a pattern in a measured mass spectrum and a corresponding pattern in a target mass spectrum does not fall within an allowable range, is configured to adjust a voltage to be applied to the ion transport optical system so that the difference falls within the allowable range.

8. The quadrupole mass spectrometer according to claim 4, further comprising an ion transport optical system between an ion source configured to generate ions derived from a sample component and the quadrupole mass filter,
   wherein the control unit, in adjusting a voltage with the voltage adjustment unit, if a difference between at least a part of a pattern in a measured mass spectrum and a corresponding pattern in a target mass spectrum does not fall within an allowable range, is configured to adjust a voltage to be applied to the ion transport optical system so that the difference falls within the allowable range.

9. The quadrupole mass spectrometer according to claim 1, wherein
   the control unit is configured to adjust the voltage so that a ratio of signal intensities of two or more predetermined peaks appearing in the measured mass spectrum approaches to a ratio of signal intensities of peaks corresponding to the predetermined peaks in the target mass spectrum.

* * * * *